United States Patent [19]

Yamamoto et al.

[11] Patent Number: 5,734,813
[45] Date of Patent: Mar. 31, 1998

[54] STORAGE APPARATUS SYSTEM FOR REALLOCATING DATA RECORDS AMONG PARITY GROUPS

[75] Inventors: Akira Yamamoto, Sagamihara; Yasutomo Yamamoto, Odawara; Hisaharu Takeuchi, Odawara; Takao Satoh, Odawara, all of Japan

[73] Assignee: Hitachi, Ltd., Tokyo, Japan

[21] Appl. No.: 511,731

[22] Filed: Aug. 7, 1995

[30] Foreign Application Priority Data

Aug. 18, 1994 [JP] Japan .................................... 6-193966

[51] Int. Cl.$^6$ ............................. G06F 12/00; G06F 13/00
[52] U.S. Cl. .................... 395/182.04; 395/618; 395/622; 395/839; 395/441; 395/488
[58] Field of Search .................... 395/182.04, 182.05, 395/440, 441, 575, 425, 839

[56] References Cited

U.S. PATENT DOCUMENTS

| | | | |
|---|---|---|---|
| 5,124,987 | 6/1992 | Milligan et al. | 371/10.01 |
| 5,155,835 | 10/1992 | Belsan | 395/425 |
| 5,210,866 | 5/1993 | Milligan et al. | 395/575 |
| 5,341,381 | 8/1994 | Fuller | 371/10.1 |
| 5,394,532 | 2/1995 | Belsan | 395/425 |
| 5,410,667 | 4/1995 | Belsan et al. | 395/425 |
| 5,463,765 | 10/1995 | Kakuta et al. | 395/182.04 |
| 5,490,248 | 2/1996 | Dan et al. | 395/182.04 |
| 5,522,032 | 5/1996 | Franaszek et al. | 395/182.04 |
| 5,530,948 | 6/1996 | Islam | 395/182.04 |
| 5,537,534 | 7/1996 | Voigt et al. | 395/182.04 |
| 5,537,567 | 7/1996 | Galbraith | 395/441 |
| 5,542,064 | 7/1996 | Tanaka et al. | 395/441 |
| 5,564,116 | 10/1996 | Arai et al. | 395/182.01 |
| 5,574,882 | 11/1996 | Menon et al. | 395/441 |
| 5,579,474 | 11/1996 | Kakuta et al. | 395/182.04 |
| 5,581,724 | 12/1996 | Belsan et al. | 395/441 |
| 5,596,709 | 1/1997 | Bond et al. | 395/182.05 |
| 5,600,783 | 2/1997 | Kakuta et al. | 395/182.04 |
| 5,600,816 | 2/1997 | Oldfield et al. | 395/440 |

FOREIGN PATENT DOCUMENTS

| | | | |
|---|---|---|---|
| A-0 584 804 | 8/1993 | European Pat. Off. | G06F 3/06 |
| A-0 606 714 | 11/1994 | European Pat. Off. | G06F 3/06 |
| WO 91/20025 | 12/1991 | WIPO | G06F 3/06 |

OTHER PUBLICATIONS

The 20th Annual Int. Symp. on Computer Architecture, "The Architecture of a Fault-Tolerant Cached RAID Controller", Jai Menon and Jim Cortney, May 16, 1993.

Third International Conference on Parallel and Distributed Information Systems, Dynamic Parity Stripe Reorganizations for RAID 5 Disk Arrays, K. Mogi and M. Kitsuregawa, Sep. 28-30, 1994.

*Primary Examiner*—Christopher B. Shin
*Attorney, Agent, or Firm*—Fay, Sharpe, Beall,Fagan, Minnich & McKee

[57] ABSTRACT

In this invention a logical record represents a record accessed by a HOST computer. A physical record represents a record defined on disk units. Physical records consist of data records and parity records. A data record has a value of a logical record. m data records and n parity records form parity records. Parity records are utilized to recover the contents of the data records which belong to the same parity group. A reduction in the generation times of updated values of parity records is realized. A data value of parity records has an allocated status to a logical record and an unallocated status. When a parity-generation scheduling unit decides generation of updated values of a parity group, it recognizes data records which are unallocated to logical records in the parity groups. Then it searches the logical records which are allocated to data records included in the other parity group. Finally it reallocates the recognized data records to the searched logical records. By reallocating data records to logical records, it becomes possible to reduce the number of the parity groups having data records allocated to logical records with updated values.

11 Claims, 14 Drawing Sheets

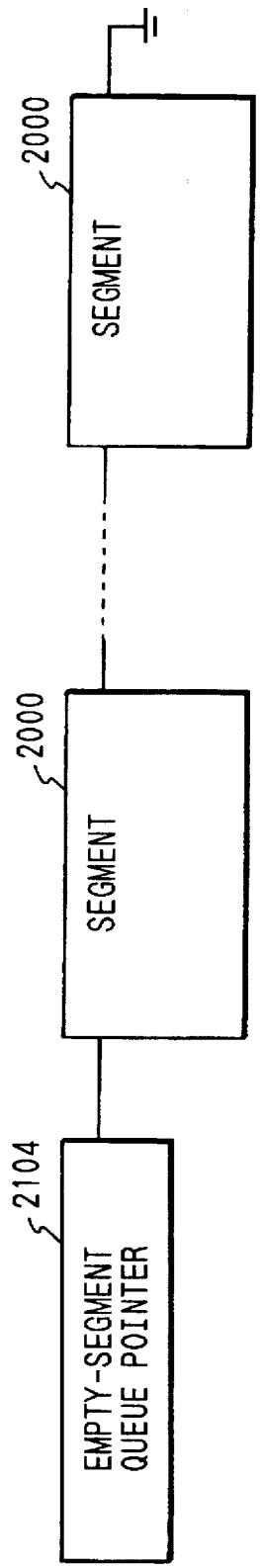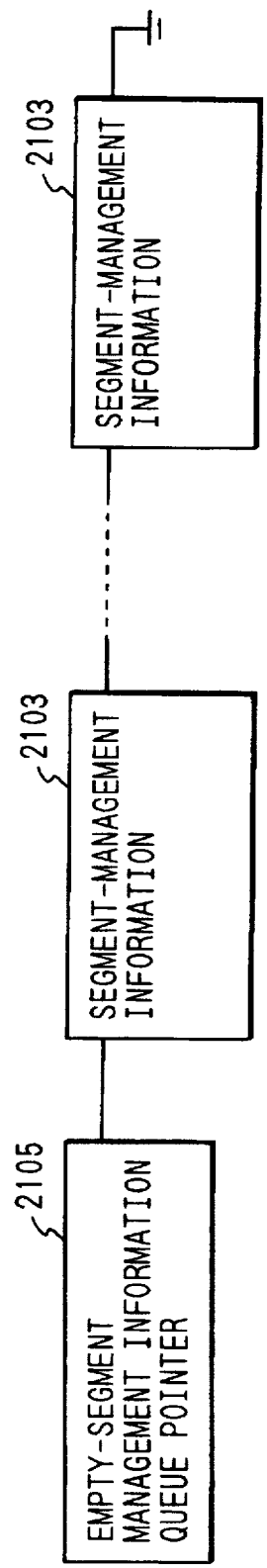

STORAGE APPARATUS SYSTEM FOR REALLOCATING DATA RECORDS AMONG PARITY GROUPS

BACKGROUND OF THE INVENTION

The present invention relates to a storage apparatus employed in a computer system. In particular, the present invention relates to a high-performance disk unit designed for controlling a disk array as well as a storage-apparatus subsystem comprising a high-performance disk unit designed for controlling a disk array and a control unit.

A disk array like the one disclosed in a thesis written by D. Patterson et al. with the title "A Case for Redundant Arrays of Inexpensive Disks (RAID)," ACM SIGMOD conference proceeding, Chicago, Ill., Jun. 1 to 3, 1988, pp. 109 to 116 is known as a storage apparatus employed in a computer system. In particular, in the thesis prepared by Patterson et al., a technique for arranging data on a disk array is disclosed.

A disk array is a mechanism developed for realizing the enhancement of the performance and reliability of a computer system. In a disk array, a plurality of physical disk units are employed. In an attempt to enhance the performance, the disk units are made to appear to the host processing unit as a single disk unit. In order to improve the reliability, on the other hand, data stored in a faulty disk unit needs to be recovered in the event of a fault occurring in one of the disk units. Redundant data for the purpose of such recovery is stored in another disk unit. In the following description, a lump of data which is read from or written to a read/write disk unit is called a record. There are two types of record: a data record and a parity record. A data record is used for storing data which is directly read and written by the host processing unit whereas a parity record is a record for storing redundant data.

In a disk array, m data records and n parity records are created where m and n are numbers greater than unity. In general, a collection of the m data records and the n parity records is known as a parity group. The m data records and the n parity records are each stored in a distinct disk unit. Normally, for n parity records in a parity group, data of the parity group can be recovered in the event of faults occurring in up to n disk units.

When a data record in the parity group is updated, it is necessary to also update the parity record associated with the data record. If all data records in the parity group have been updated, the contents of the parity records can be created from the updated data records. Consider, however, that only one data record of the parity group is updated for example. In this case, a new value of the parity record associated with the data record can be created from the updated contents of the data record, the old contents of the data record and the old contents of the parity record.

A technique called dynamic mapping is disclosed in the PCT WO 91/20025 as a technology for enhancing the efficiency of the write processing in such a disk array. In this technique, when data stored in a disk is updated in write processing, the location on the disk to which data is to be written is dynamically changed. To put it in more concrete terms, data is written into disk units composing a disk array wherein a parity group is composed of only written data and parity data is created from these pieces of data. It should be noted that, in order to execute the above processing, it is necessary to put the entire parity group in a state that allows new update values to be written. In this patent specification, such a state is called an unallocated state.

A technology that makes such dynamic mapping more efficient is disclosed in DE93-45, a technological-research report issued by the Learned Society of Electronics, Information and Telecommunication Engineers (written by Mogi et al. with the title "Evaluation of the Performance of a Disk Array of the RAID-5 Type," September 1993, the Learned Society of Telecommunication Engineers, Vol. 25—No. 251, pp 69 to 75). In the technology disclosed in this thesis, locations on disks of the parity group itself are dynamically changed, allowing the entire parity group to be put efficiently in an unallocated state.

In the above technologies disclosed in the PCT WO 91/20025 and the thesis written by Motegi et al., in order to enhance the efficiency of the write processing in a disk array, a parity group is composed of only data records experiencing write processing and parity records are created from these data records. For storing records of a newly created parity group, it is thus necessary to make some excess records available in disk units and to provide a parity group comprising only records in an unallocated state, that is, records not storing most recently updated contents by the host processing unit. For this reason, it is therefore necessary to execute processing to put the entire parity group into an unallocated state asynchronously with processing to handle an access request issued by the host processing unit. However, the processing of the conventional technology to put the entire parity group in an unallocated state makes the performance of a disk array very difficult to predict.

SUMMARY OF THE INVENTION

It is an object of the present invention to enhance the efficiency of the write processing carried out in a storage apparatus system by implementing the dynamic-mapping technique described above without performing special processing to put an entire parity group in an unallocated state.

In a storage apparatus system provided by the present invention wherein parity groups are each composed of data records allocated to logical records, in which the data is read and written by the host processing unit, and parity records used for recovering data of a data record in the event of a fault and the data and parity records of each parity group are arranged in disk unit units different from record to record, the object described above is achieved by carrying out the steps of:

determining the parity group, the new values of the parity records of which are to be created, in accordance with the states of data records of each parity group;

identifying data records which are belong to the determined parity group and are not allocated to logical records;

changing assignment of logical records which have their new values stored in cache memory and to which data records which belong to parity groups other than the determined parity group are allocated, to the data records identified at the above step;

creating new values of the parity records of the determined parity group; and storing the new values of the data and parity records which belong to the determined parity group in their respective disk units.

In a more preferred embodiment, the processing of each of the steps described above is carried out with timings independent of the processing to store the new value of a logical record in the cache memory at a write request made by the processing unit.

In addition, the step of determining a parity group further comprises the next step of:

searching for parity groups, no data records of which are allocated to logical records; and selecting a found-out particular parity group resulting from the search carried out at the above substep, as a parity group the new values of the parity records of which are to be created.

Furthermore, at the step of changing the assignment, logical records whose assignment is to be changed are selected from logical records to which data record in the predetermined range of disk units including data records which belong to the determined parity group are allocated.

As described above, according to the present invention, if data records not allocated to logical records exist in a parity group the new values of the parity records of which are determined to be created, the assignment between such logical records and logical records having new values to data records pertaining to other parity groups is changed before the parity record are created. As a result, the number of accesses to the disks required in the creation of new values of the parity records can be reduced in comparison with the case without the changing of the assignment between logical records.

In addition, if some data records in an unallocated state, that is, data records not allocated to logical records exist in a parity group, the assignment between such logical records and logical records to which data records pertaining to other parity groups are allocated is changed. Therefore, the unallocated data records can be utilized effectively. On top of that, unlike the conventional technology described earlier, the necessity to execute special processing to put all data records of a parity group in an unallocated state can thereby be eliminated.

BRIEF DESCRIPTION OF THE DRAWINGS

FIG. 11 is a diagram showing the configuration of an empty-segment queue;

FIG. 12 is a diagram showing the configuration of an empty-segment management information queue;

DESCRIPTION OF THE PREFERRED EMBODIMENTS

Figure 1:
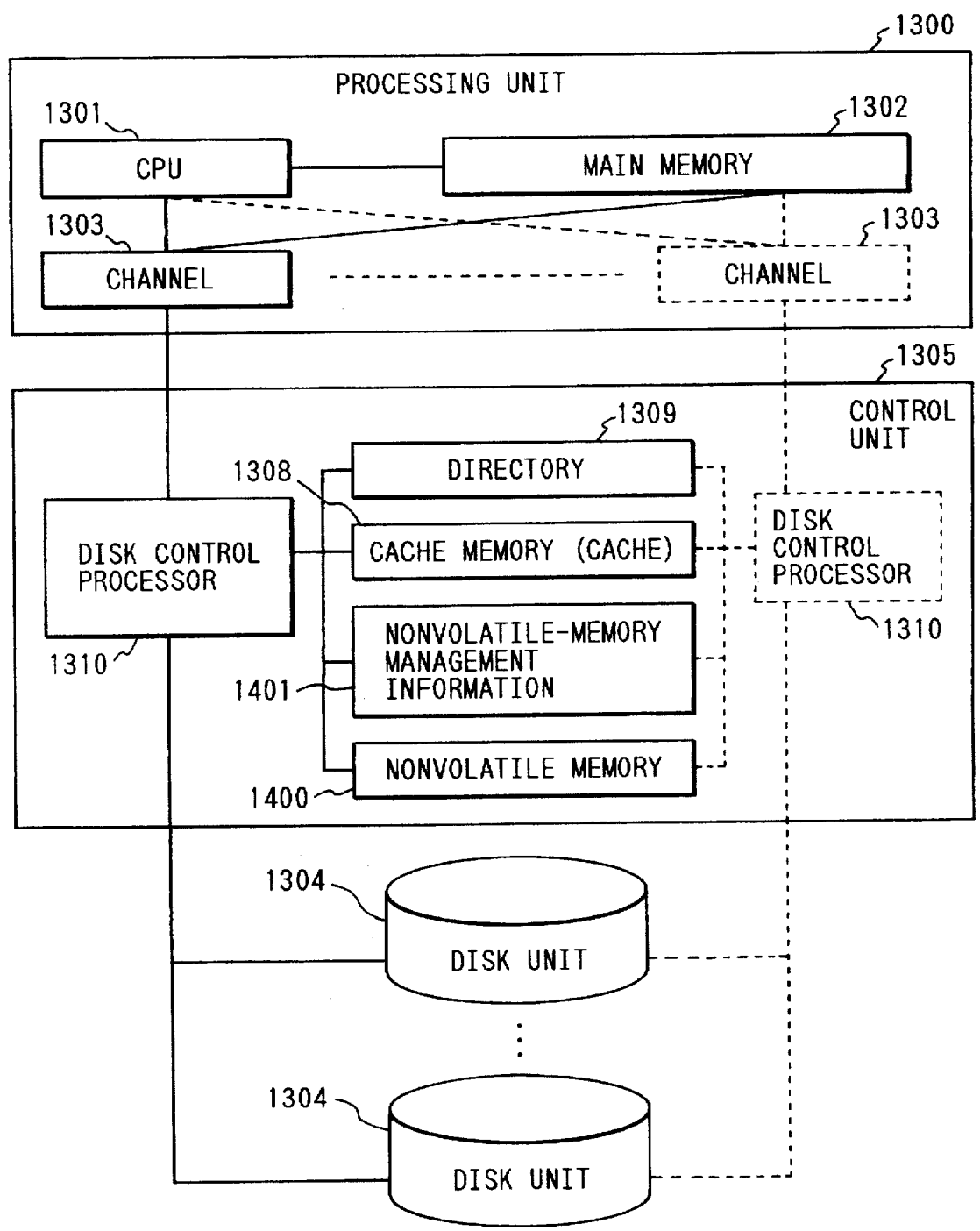
FIG. 1 is a diagram showing the configuration of a computer system in a first embodiment.

The present invention will become apparent from the following detailed description of preferred embodiments with reference to accompanying diagrams. FIG. 1 is a diagram showing the configuration of a computer system, in the present invention. In this embodiment, the computer system comprises main components: a processing unit 1300, a control unit 1305 and one or more disk units 1304. The processing units 1300 comprises a CPU 1301, a main memory unit 1302 and channels 1303.

The control unit 1305 executes processing to transfer data from the processing unit 1300 to the disk units 1304 or vice versa in accordance with a read/write request issued by the processing unit 1300. The control unit 1305 comprises one or more disk control processors 1310, a cache memory unit 1308, which is referred to hereafter simply as a cache, a directory 1309, a nonvolatile memory unit 1400 and nonvolatile-memory management information unit 1401. Data stored in the disk units 1304 that is accessed frequently is stored into the cache 1308. The directory 1309 is used for storing management information of the cache 1308. The nonvolatile memory unit 1400 is a nonvolatile medium. Much like the cache 1308, data stored in the disk units 1304 that is accessed frequently is loaded into the nonvolatile memory unit 1400. The nonvolatile-memory management information unit 1401 is also a nonvolatile medium for storing management information of the nonvolatile memory unit 1400. It should be noted that the cache 1308 and the directory 1309 can also be made nonvolatile as well. The disk control processors 1310 employed by the control unit 1305 each have a function to execute processing to transfer data from the processor unit 1300 and the disk units 1304 and vice versa by utilizing, among other components, the cache 1308 in accordance with a read/write request issued by the processor unit 1300. It should be noted that the control unit 1305 does not necessarily include the nonvolatile memory unit 1400 and the nonvolatile-memory management information unit 1401.

In this embodiment, when the control unit 1305 receives a write request from the processor unit 1300, the control unit 1305 notifies the processor unit 1300 of the completion of the write operation at the time data to be written into the disk unit 1304 is stored in the cache 1308 or in the cache 1308 and the nonvolatile memory unit 1400. Later on, an operation to actually write the data into the disk unit 1304 is executed by the control unit 1305. Such an operation is called write-after processing. As described above, a plurality of disk control processors 1310 can be provided in the control unit 1305. As shown in FIG. 1, a typical second disk control processor 1310 is enclosed in dashed-line box to show an additional configuration in the case where the control unit 1305 includes two disk control processors 1310.

Figure 2:
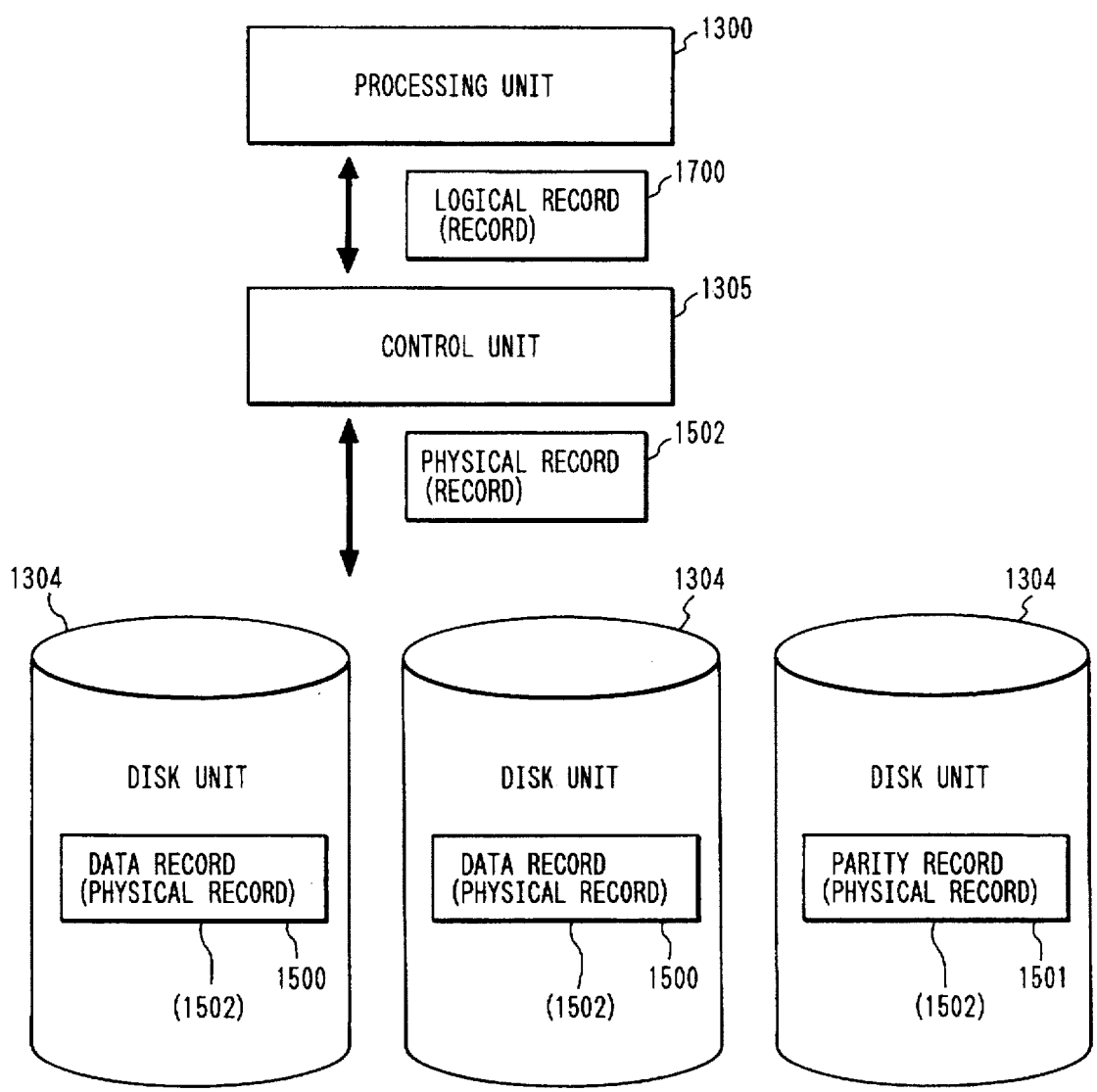
FIG. 2 is a diagram showing definitions of records.

Normally, a lung of data which the processing unit 1300 writes and reads into and from the disk units 1304 in units is called a record. FIG. 2 is a record-definition diagram putting together the concepts of records adopted in the embodiment. In this embodiment, read and write records exchanged between the processing unit 1300 and the control unit 1305 are each called a logical record 1700. On the other hand, a record stored in the disk unit 1304 is called a physical record 1502. A physical record 1502 stored in the disk unit 1304 can be either a data record 1500 or a parity record 1501. A data record 1500 is a physical record 1502 for storing the contents of a logical record 1700 read or written by the processing unit 1300. A parity record 1501 is, on the other hand, a physical record 1502 used in processing to recover the contents of a data record 1500 which contents have been lost due to a fault occurring in one of the disk units 1304. When the value of a data record 1500 is changed, the contents of a parity record 1501 associated with the data record also need to be changed.

Figure 3:
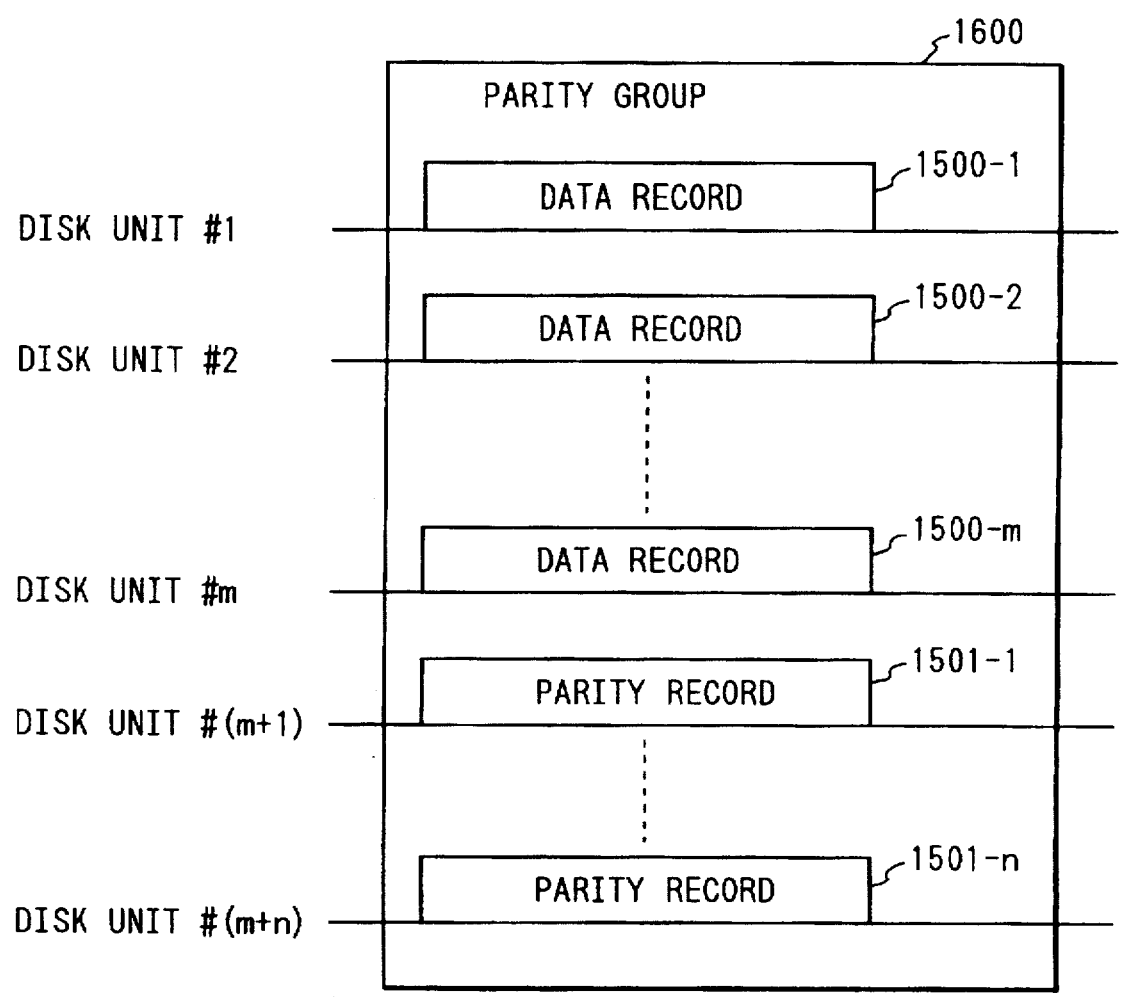
FIG. 3 is a diagram showing the concept of a parity group in a disk array.

FIG. 3 is a diagram showing the concept of a parity group in the disk array. As shown in the figure, m data records 1500 are each stored in one of m disk units 1304, disk units #1 to #m. n parity records 1501 are created from these m data records 1500 and each stored in one of n disk units 1304, disk units #(m+1) to #(m+n). In the example shown in the figure, a parity group 1600 thus comprises m data records 1500 and n parity records 1501. In general, in the case of a parity group 1600 comprising n parity records 1501, the contents of all physical records 1502 of the parity group 1600 can be recovered even in the event of faults occurring in up to n disk units 1304 out of (m+n) disk units 1304 used for storing the physical records 1502 of the parity group 1600. By applying a disk array in this way, the reliability enhancement of the disk units 1304 can be realized.

In the example shown in FIG. 3, the data records 1500 are stored in disk units #1 to #m whereas the parity records 1501 are stored in disk units #(m+1) to #(m+n). It is worth noting, however, that all physical records 1502 stored in the disk units 1304, from disk unit #1 to disk unit #m, do not have to be data records 1500. Likewise, all physical records 1502 stored in the disk units 1304, from disk unit #(m+1) to disk unit #(m+n), do not have to be parity records 1501. That is to say, in the case of another parity group, it is possible to store data records 1500 thereof in, for example, disk units #2 to #(m+1) and its parity records 1501 in disk unit #1 and disk unit #(m+2) to #(m+n).

It should be noted that the number of disk units 1304 does not have to be adjusted to the number of physical records in a parity group. In the case of the parity group comprising (m+n) physical records as shown in FIG. 3, more than (m+n) disk units can be employed wherein the physical records of the parity group are stored in any (m+n) disk units. Similarly, the number of physical records pertaining to a parity group is not necessarily limited to (m+n).

In addition, in this embodiment, a logical record 1700 can be stored in one data record 1500 or, if necessary, in more than one data record 1500.

Figure 4:
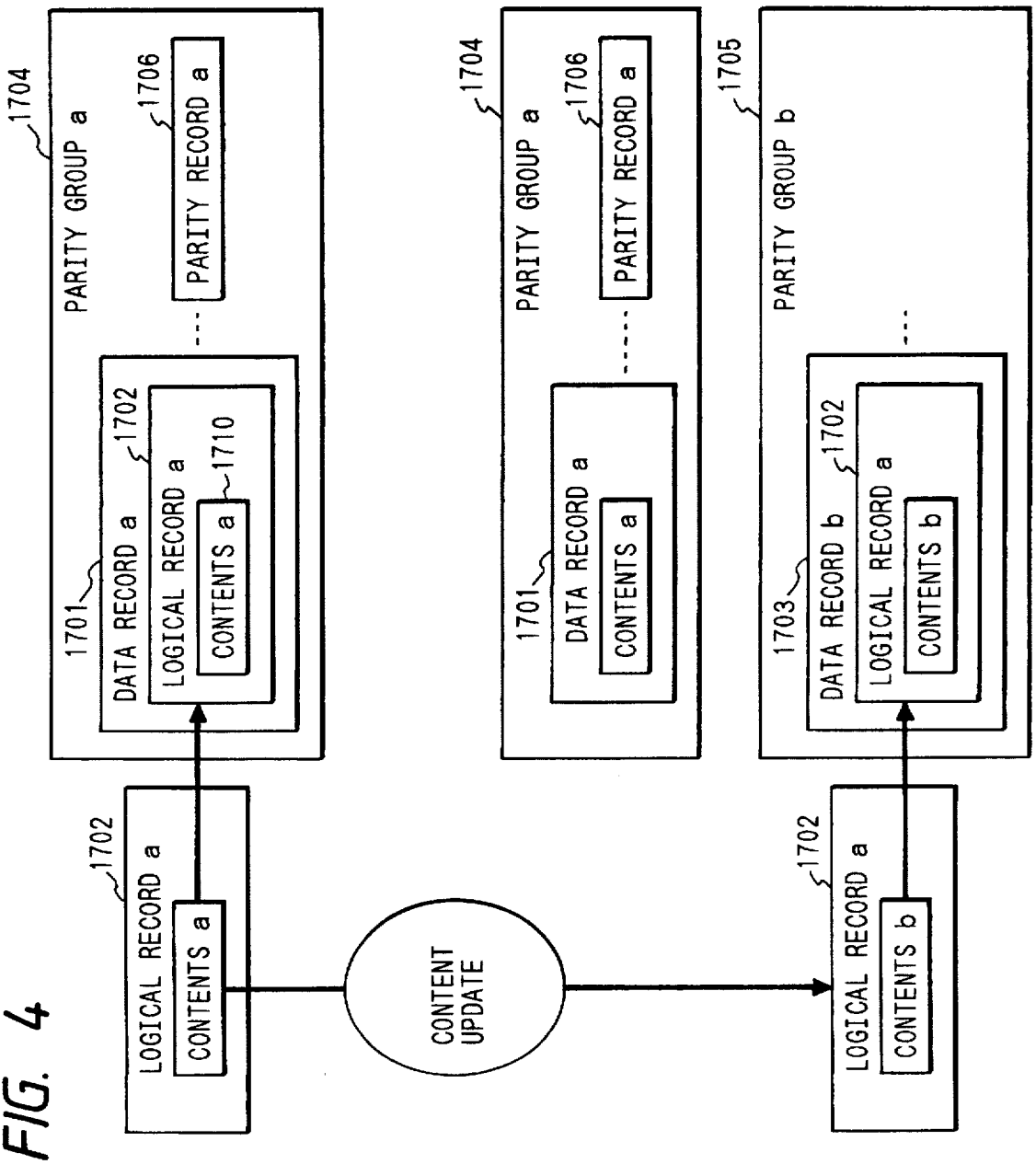
FIG. 4 is a diagram showing the concept of a change in mapping.

In this embodiment, the amount of data that can be stored in all data records 1500 is greater than the amount of data of all logical records 1700. For this reason, a data record 1500 exists either in a state where the data record 1500 is allocated to a logical record 1700 or in a state where the data record 1500 is unallocated to a logical record 1700. The former and latter states are referred to hereafter as allocated and unallocated states respectively. FIG. 4 is a conceptual diagram showing relations between logical records 1700 and data records 1500. For example, a logical record (a) denoted by reference numeral 1702 having contents (a) is initially assigned to a data record (a) denoted by reference numeral 1701 which data record is included in a parity group (a) denoted by reference numeral 1704. There, the logical record (a) denoted by reference numeral 1702 is updated, having its contents (a) changed to contents (b). In this embodiment, in some cases, a data record (b) pertaining to a parity group (b), which data record and parity group are denoted by reference numerals 1703 and 1705 respectively, is allocated to the logical record (a) having the new contents (b) after the contents (a) have been updated to the contents (b) as will be explained below. In such a case, the data record (a) denoted by reference numeral 1701, which data record was allocated to the logical record (a) denoted by reference numeral 1702 prior to the updating process, is now in an unallocated state, being allocated to no logical record 1700. Even in this case, however, data stored in the data record (a) denoted by reference numeral 1701 is required for recovering the contents of other data records 1500 pertaining to the parity group (a) denoted by reference numeral 1704. For this reason, the contents of the data record (a) denoted by reference numeral 1701 can not be simply changed to other data. That is to say, when the data record (a) denoted by reference numeral 1701 is allocated to a new logical record 1700, it becomes necessary to update the value of a parity record (a) denoted by reference numeral 1706 in accordance with the contents thereof.

Figure 5:
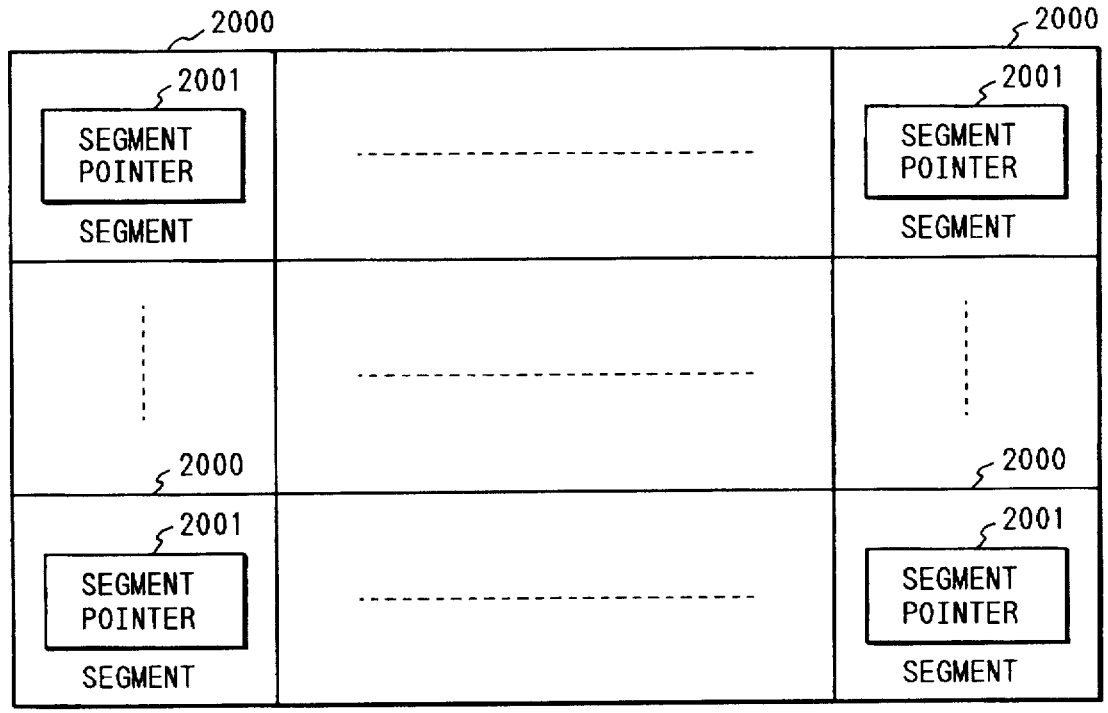
FIG. 5 is a diagram showing the logical configuration of a cache memory.

FIG. 5 is a diagram showing the logical configuration of the cache 1308. As shown in the figure, the cache 1308 is divided into a plurality of segments 2000. Each of the segments 2000 is used for storing either the contents of a data record 1500, the contents of a parity record 1501, a new value of a logical record 1700 or other. In addition, the segments 2000 each have a segment pointer 2001. The segment pointers 2001 are used to put unused segments 2000 in a chain connection.

The nonvolatile memory unit 1400 has a configuration logically identical with that of the cache 1308, making it unnecessary to specifically show the configuration of the nonvolatile memory unit 1400 in a figure.

Figure 6:
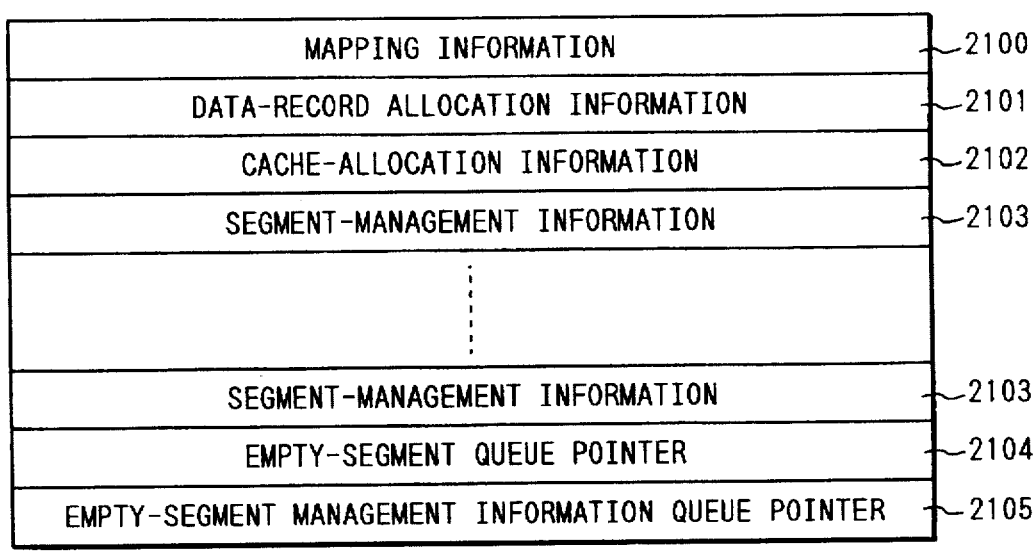
FIG. 6 is a diagram showing the logical configuration of a directory.

FIG. 6 is a configuration diagram showing logically successive pieces of information stored in the directory 1309. The information stored in the directory 1309 comprises mapping information entry 2100, data-record allocation information entry 2101, cache-allocation information entry 2102, segment-management information entry 2103, empty-segment queue pointer 2104 and empty-segment management information queue pointer 2105. There are as many segment-management information entries 2103 as segments 2000 composing the cache 1308. As will be described later, however, the segment-management information entries 2103 are not associated with the segments 2000 on a one-to-one basis. The above pieces of information are each described in detail as follows.

Figure 7:
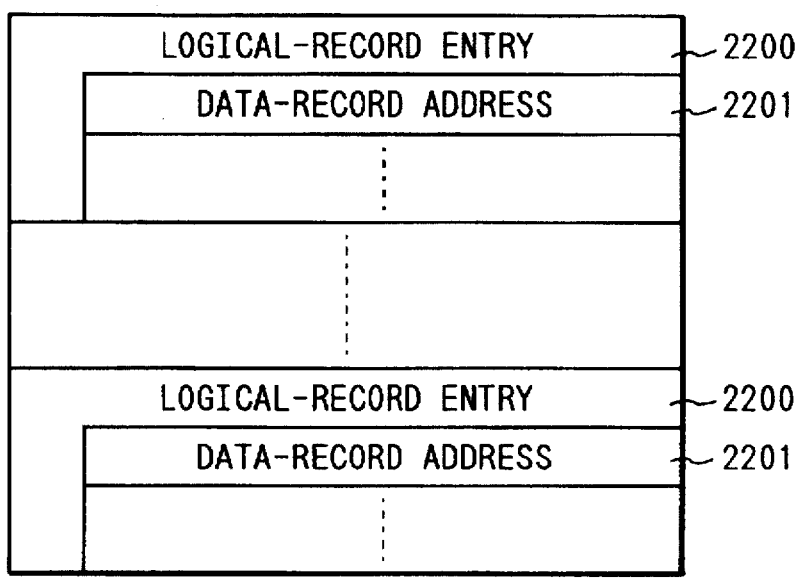
FIG. 7 is a diagram showing the logical configuration of mapping information.

FIG. 7 is a configuration diagram showing the logical configuration of the mapping information entry 2100 that indicates which data record 1500 on a disk unit 1304 to which each logical record 1700 is assigned. A logical record entry 2200 is information provided for each logical record 1700. Each of the logical record entries 2200 includes data-record addresses 2201 that indicate to which data records 1500 on a disk unit 1304 data of the corresponding logical record 1700 is assigned. In this embodiment, each of the logical record entries 2200 includes one or more data-record addresses 2201.

Figure 8:
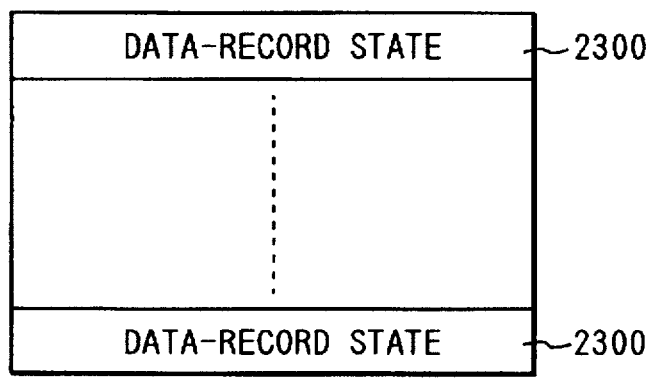
FIG. 8 is a configuration diagram of information on allocation of data records.

FIG. 8 is a configuration diagram showing the logical configuration of the data-record allocation information entry 2101. The data-record allocation information entry 2101 has data record status 2300 which each corresponds to a data record 1500. Each data record status 2300 holds information indicating whether or not the corresponding data record 1500 are allocated to a logical record. That is, each data record status 2300 represents an allocated status or an unallocated status.

Figure 9:
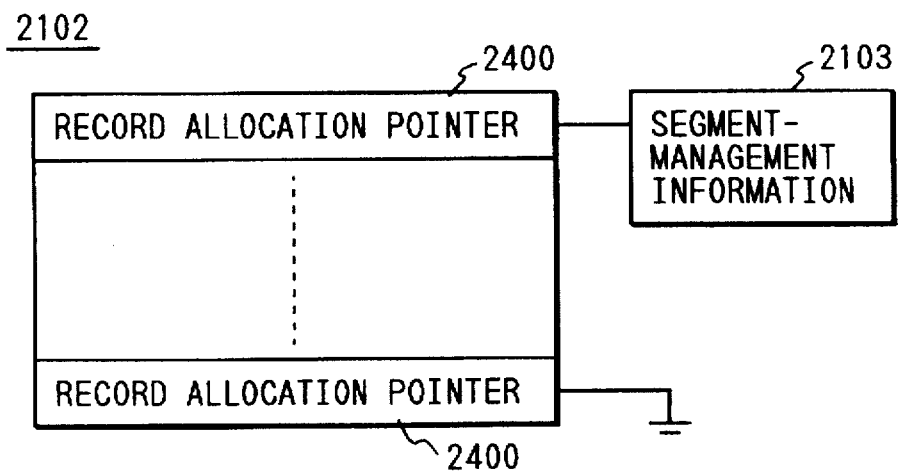
FIG. 9 is a configuration diagram of information on allocation of the cache memory.

FIG. 9 is a configuration diagram showing the logical configuration of the cache-allocation information entry 2102. The cache-allocation information entry 2102 as entries 2400 which each correspond to a physical record, that is, a data record 1500 or a parity record 1501 on a disk unit 1304. Each of the entries 2400 holds information indicating whether or not the corresponding data or parity record 1500 or 1501 is stored in the cache 1308. If the corresponding data or parity record 1500 or 1501 is stored in the cache 1308, the entry 2400 holds a pointer pointing to the segment-management information entry 2103. This pointer is called a record-allocation pointer 2400. If the corresponding data or parity record 1500 or 1501 is not stored in the cache 1308, on the other hand, the value of the record-allocation pointer 2400 is set at null.

Figure 10:
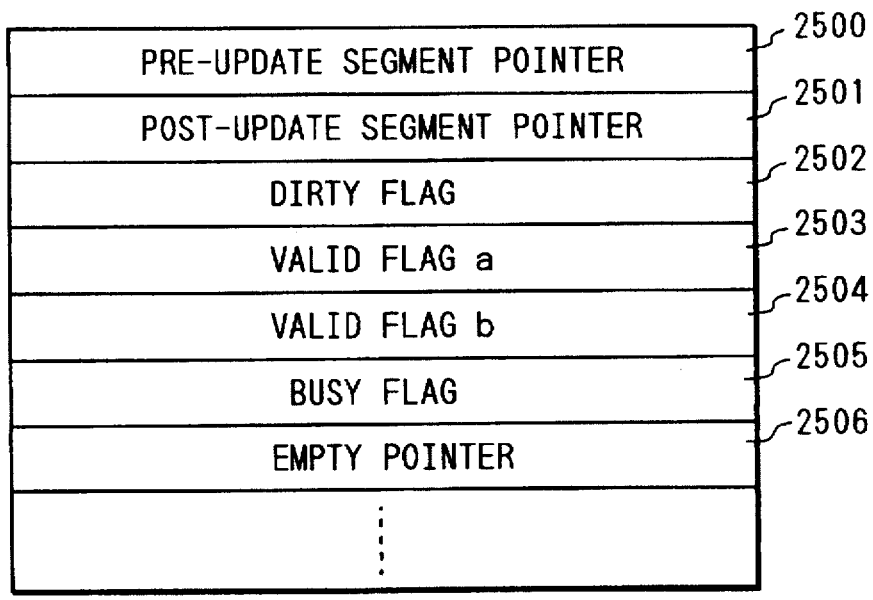
FIG. 10 is a configuration diagram of segment-management information.

FIG. 10 is a configuration diagram showing the logical configuration of the segment-management information entry 2103 which has various kinds of information used for managing each segment of the cache 1308. As shown in the figure, the segment-management information entry 2103 comprises a pre-update segment pointer 2500, a post-update segment pointer 2501, a dirty flag 2502, a valid flag (a) 2503, a valid flag (b) 2504, a busy flag 2505 and an empty pointer 2506 which are relevant to the present invention. It should be noted information not directly relevant to the present invention is not specifically shown in the figure.

In the case of a segment-management information entry 2103 for a data record 1500, the pre-update segment pointer 2500 included therein points to a segment 2000 containing a value for which a new value of the parity record 1501 has not been created. In the case of a segment-management information entry 2103 for a parity record 1501, on the other hand, the pre-update segment pointer 2500 included therein points to a segment 2000 allocated for temporary use in the creation of a new value of the parity record 1501.

In the case of a segment-management information entry 2103 for a data record 1500, the post-update segment pointer 2501 included therein points to a segment 2000 containing a value for which a new value of the parity record 1501 has been created. In the case of a segment-management information entry 2103 for a parity record 1501, on the other hand, as a rule, in a segment 2000 pointed to by the post-update segment pointer 2501, the new value of the parity record 1501 is stored.

The dirty flag 2502 indicates that data held in a segment 2000 pointed to by the post-update segment pointer 2501 has not been written into a disk unit 1304. The valid flag (a) denoted by reference numeral 2503 holds information to indicate that data held in a segment 2000 pointed to by the pre-update segment pointer 2500 is valid or, in other words, indicate that the segment 2000 contains valid data. On the other hand, the valid flag (b) denoted by reference numeral 2504 holds information to indicate that data held in a segment 2000 pointed to by the post-update segment pointer 2501 is valid or, in other words, indicate that the segment 2000 contains valid data. The busy flag 2505 holds information to indicate that the segment-management information entry 2103 is being used. The empty pointer 2506 is used to link segment-management information entries 2103 in an empty state to each other.

FIG. 11 is a configuration diagram showing the logical configuration of a empty-segment queue. As shown in the figure, the empty-segment queue starts with the empty-segment queue pointer 2104 of the directory 1309, forming a sequence of segments 2000 in an empty state. To put it in more concrete terms, the empty-segment queue pointer 2104 is linked to a first segment 2000 pointed to by the empty-segment queue pointer 2104 of the directory 1309. The first segment 2000 pointed to by the empty-segment queue pointer 2104 of the directory 1306 is linked to a second segment 2000 behind the first segment 2000 which second segment 2000 is pointed to by the segment pointer 2001 of first segment 2000. Thereafter, a chain of empty segments 2000 is formed by the segments pointer 2001 of the segments 2000. The chain is referred to as an empty-segment queue. It should be noted that the segment pointer 2001 of the last segment 2000 on the empty-segment queue typically has a null value to indicate that there is no segment 2000 following the last segment 2000. In the figure, the last segment 2000 is indicated by linking it to the earth symbol.

FIG. 12 is a configuration diagram showing the logical configuration of a empty-segment management information queue. As shown in the figure, the empty-segment management information queue starts with the empty-segment management information queue pointer 2105 of the directory 1306, forming a sequence of segment-management information entries 2103 in an empty state. Much like the empty segments described above, segment-management information entries 2103 are linked to each other by using the empty pointers 2506 thereof which are each used for pointing to a succeeding segment-management information entry 2103. Similarly, the empty pointer 2506 of the last segment-management information entry 2103 on the empty-segment management information queue typically has a null value to indicate that there is no segment-management information entry in an empty state following the last segment-management information entry 2103.

The configuration of the directory 1309 has been described above. Since the nonvolatile memory management information 1401 has the same configuration as the directory 1309, no detailed description of the nonvolatile memory management information 1401 is given here.

Figure 13:
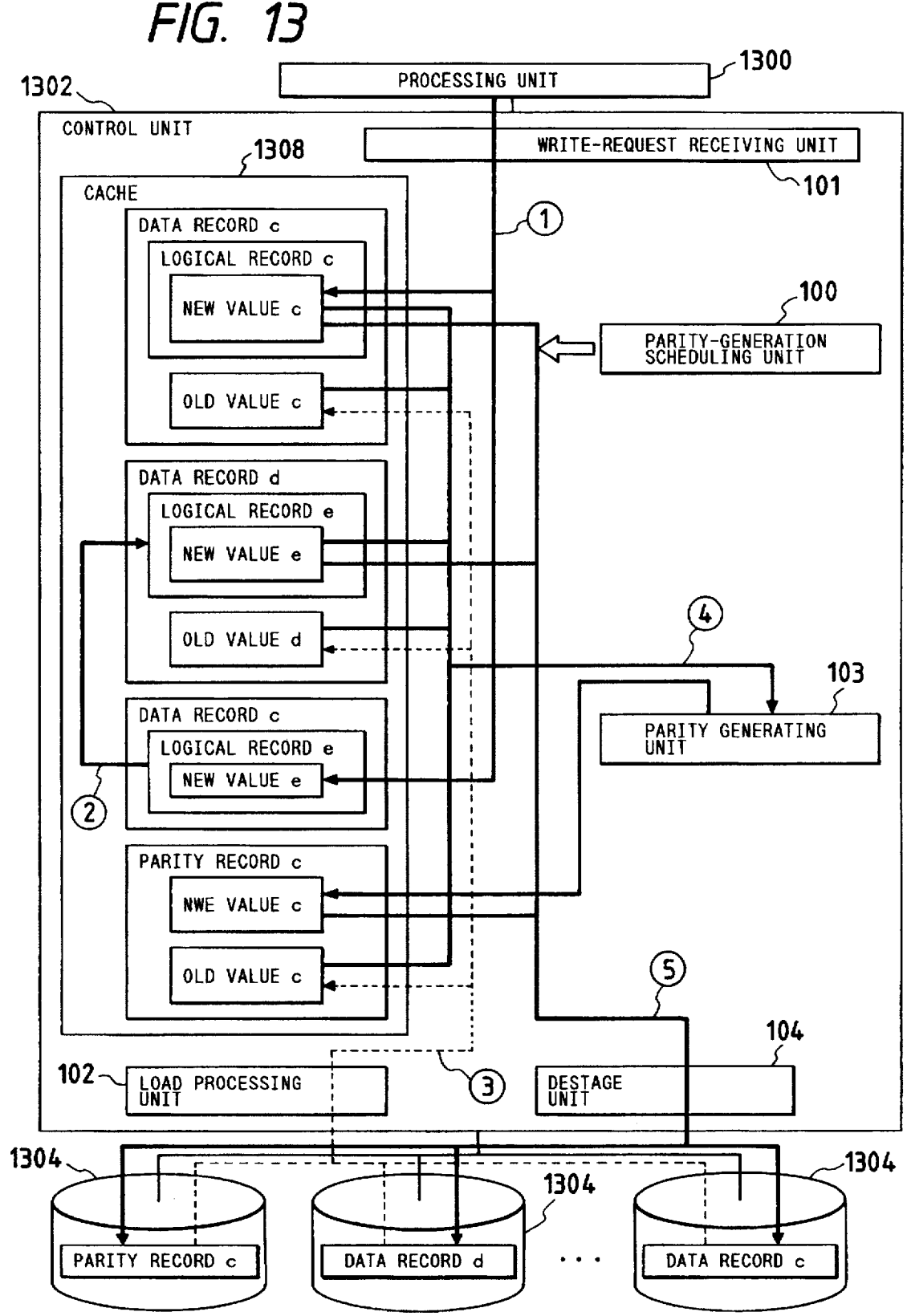
FIG. 13 is a data-flow diagram showing the flow of data in processing to create a new value of a parity record.

FIG. 13 is a data-flow diagram showing an outline of processing carried out by the control unit 1305 of this embodiment. In this embodiment, a write-request receiving unit 101, a parity-generation scheduling unit 100, a parity generating unit 103, a destage unit 104 and a load processing unit 102 are implemented through program control by the disk control processors 1310.

Receiving a write request from the processing unit 1300, the write-request receiving unit 101 stores a new value of a logical record 1700 in the cache 1308. The parity-generation scheduling unit 100 determines which data record 1500 the new value of the logical record 1700 received from the processing unit 1300 should be stored into and in the next step, what procedure should be executed in the creation of a new value of the associated parity record 1501. The load processing unit 102 reads out a record from a disk unit 1304 and stores it in the cache 1308. The destage unit 104 stores new values of parity records and logical records stored in the cache 1308 into the disk units 1304. In addition, the parity generating unit 103 generates a new value for a parity record in accordance with decisions made by the parity-generation scheduling unit 100.

Processing to update a record is described as follows.

Figure 14:
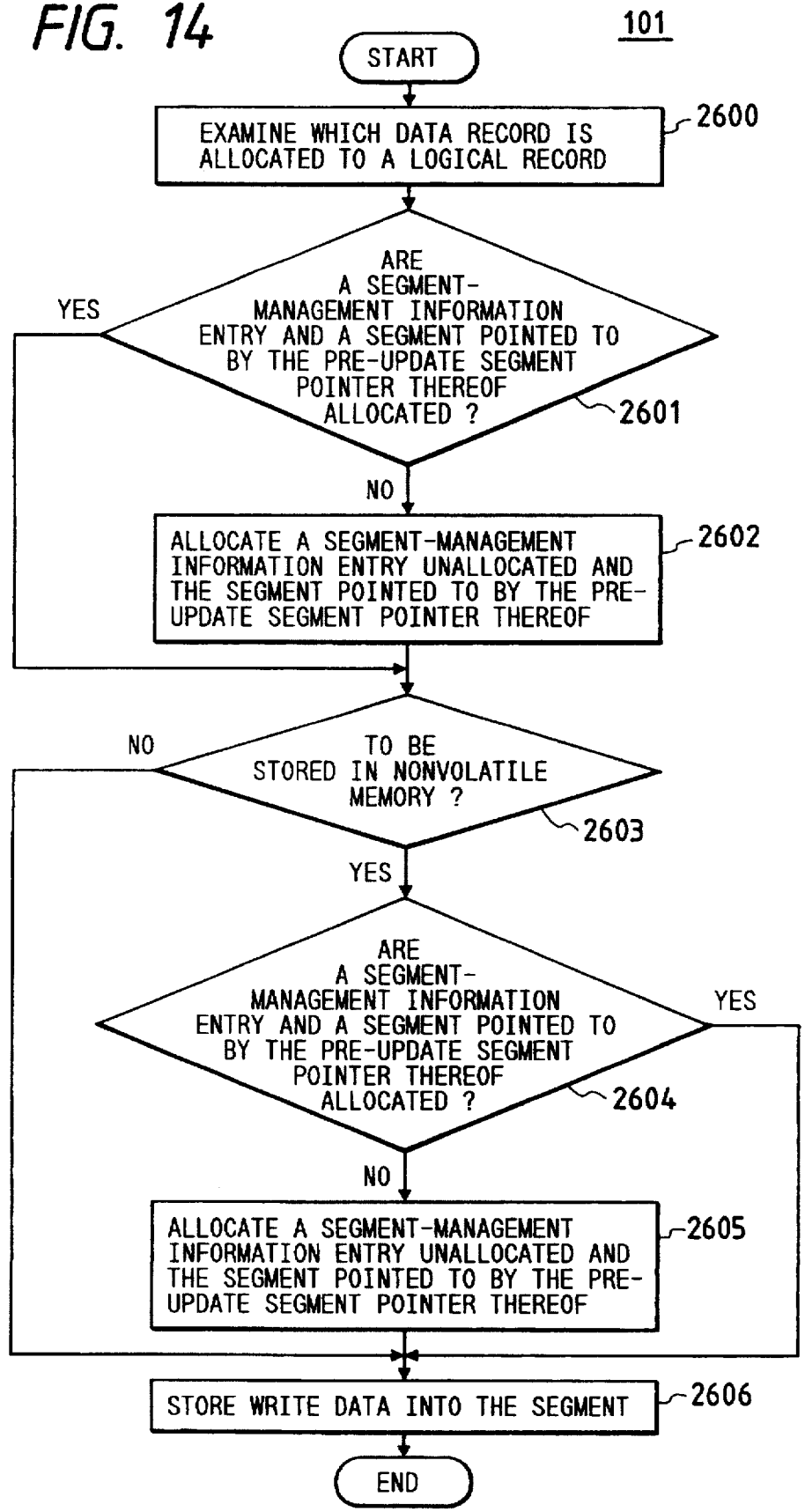
FIG. 14 is a flowchart of processing which is carried out when a write request is received.

FIG. 14 is a flowchart of processing carried out by the write-request receiving unit 101. In response to a write request from the processing unit 1300, the write-request receiving unit 101 starts an operation to write data into the cache 1308.

Receiving a write request, the write-request receiving unit 101, first of all, at a step 2600, checks which data record 1500 on a disk unit 1304 the logical record 1700 specified in the write request is assigned to. The data record 1500 on a disk unit 1304 which the logical record 1700 specified in the write request is assigned to can be checked by referencing the mapping information entry 2100 in the directory 1309. The processing then proceeds to a next step 2601 to determine whether or not a segment 2000 in the cache 1308 and its associated segment-management information entry 2103 are allocated to the data record 1500. The judgment at the step 2601 can be made by, first of all, referencing the cache-allocation information entry 2102 in the directory 1309 to examine whether or not the segment-management information entry 2103 is allocated to the data record found at the step 2600. If the segment-management information entry 2103 is found allocated, a segment 2000 pointed to by the pre-update segment pointer 2501 of the segment-management information entry 2103 is further checked to find out whether or not the segment 2000 is allocated. If an unallocated segment-management information entry 2103 and an unallocated segment 2000 are found at the step 2601, the flow continues to a step 2602 to reserve the necessary segment-management information entry 2103 and segment 2000. In this case, the busy flag 2504 of the segment-management information entry 2103 is turned on.

The flow then continues to a step 2603 to determine whether or not the write data is to be written into the nonvolatile memory unit 1400. If the write data is found to be written into the nonvolatile memory unit 1400, the flow continues to steps 2604 and 2605 to carry out processings similar to those of the steps 2601 and 2602 respectively.

If the write data is found at the step 2603 not to be written into the nonvolatile memory unit 1400, on the other hand, the flow continues to a step 2606 to store the write data received from the processing unit 1300 into the segment 2000 of the cache 1308. The flow also enters the step 2606 after completing the processings which were carried out at the steps 2604 and 2605 after the write data was found at the step 2603 to be written into the nonvolatile memory unit 1400. In the latter case, the record of the write data is stored also in the nonvolatile memory unit 1400. Then, the management information in the segment-management information entry 2103 for the segment 2000 used for storing the write data is updated.

Figure 15:
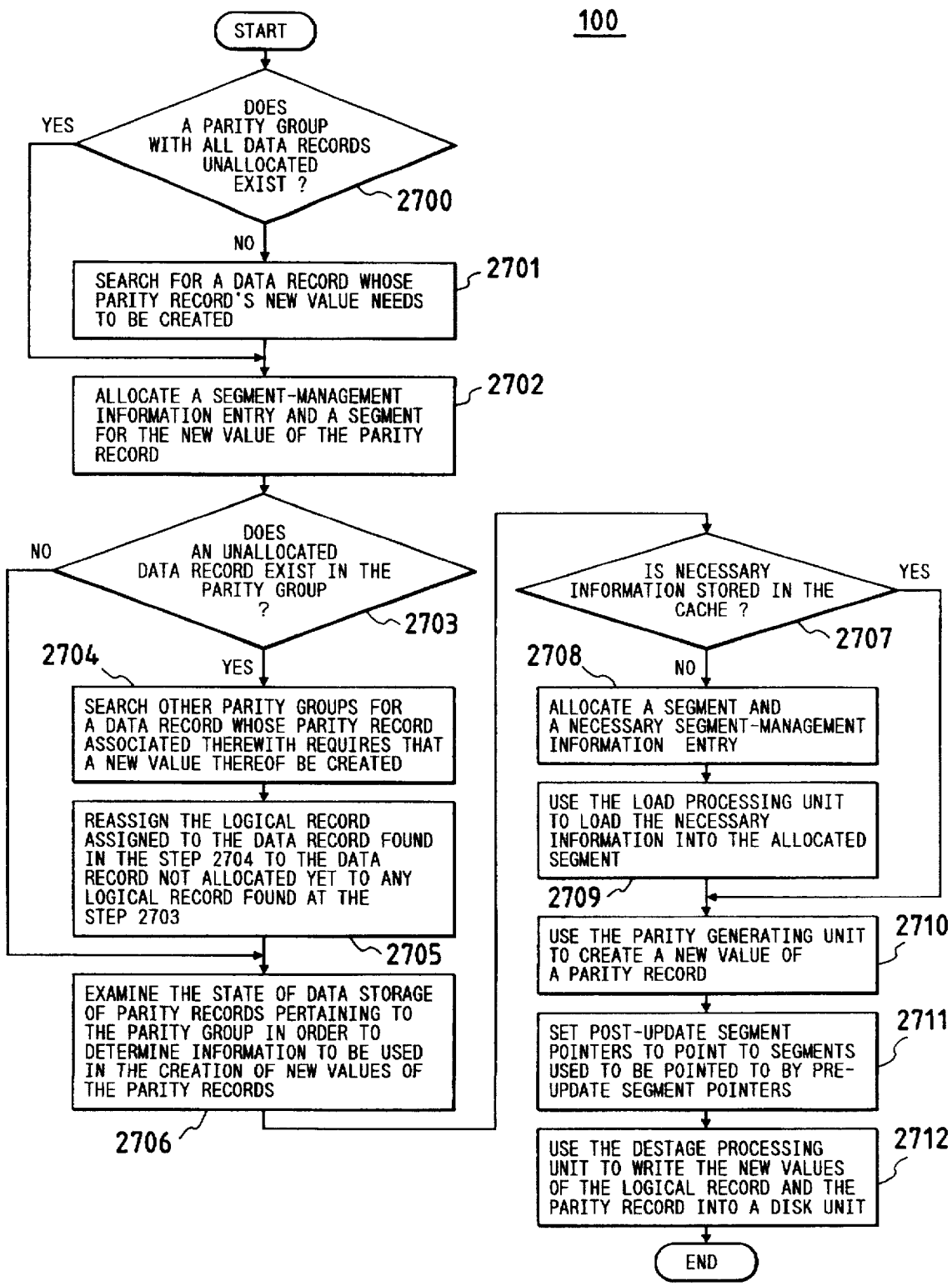
FIG. 15 is a flowchart of processing to create a new value of a parity record.

As described above, when a logical record is updated, the parity-generation scheduling unit 100 determines which data record the new value of the logical record is to be assigned to and furthermore determines how a new value for the parity record is to be generated. This processing is carried out by the parity-generation scheduling unit 100 asynchronously with (independently of) the reception of a write request from the processing unit 1300 by the write-request receiving unit 101. FIG. 15 is a flowchart of processing carried out by the parity-generation scheduling unit 100.

First of all, at a step 2700, the parity-generation scheduling unit 100 examines whether or not a parity group in which all data records are in an unallocated status exists. If a parity group in which all the data records are in an unallocated status exists, the flow jumps to a step 2702 to schedule the creation of new values for parity records of the parity group. If such a parity group does not exist, on the other hand, the flow proceeds to a step 2701 to search for a data record 1500 which has a value for which a new value of a parity record 1501 has not been created. If such a data record 1500 is found, the creation of a new value for a parity record of a parity group to which the data record belongs is scheduled.

At the step 2702, in order to store a new value of a parity record in the parity record, a segment 2000 of the cache 1308 and, if necessary, a segment-management information entry 2103 are obtained. At that time, the busy flag 2504 of the segment-management information entry 2103 are turned on. It should be noted that the pre-update segment pointer 2500 of the segment-management information entry 2103 is set to point to the obtained segment 2000.

As a parity group, wherein the creation of a new value for a parity record thereof is scheduled, is determined, the flow continues to a step 2703 to examine whether or not a data record unallocated to a logical record exists in the parity group. If a data record unallocated to a logical record does not exist in the parity group, the flow jumps to a step 2706. If a data record unallocated to a logical record exists in the parity group, on the other hand, the flow proceeds to a step 2704 to search for a logical record to be assigned to the data record. A logical record searched for at the step 2704 is a logical record which is assigned to a data record in another parity group and has an updated value by the processing unit 1300. In addition, a new value of a parity record 1501 for the updated value of the logical record needs to be created. It should be noted that, in this case, the entire area of each disk unit 1304 does not have to be searched. Instead, the search range can be limited to a certain area of each disk unit 1304. By limiting the search range, logical records having numbers close to each other can be assigned to areas close to each other in a disk unit 1304, allowing sequential read/write operations executed in an increasing order of the numbers of logical records to be carried out at a high speed.

Figure 16:
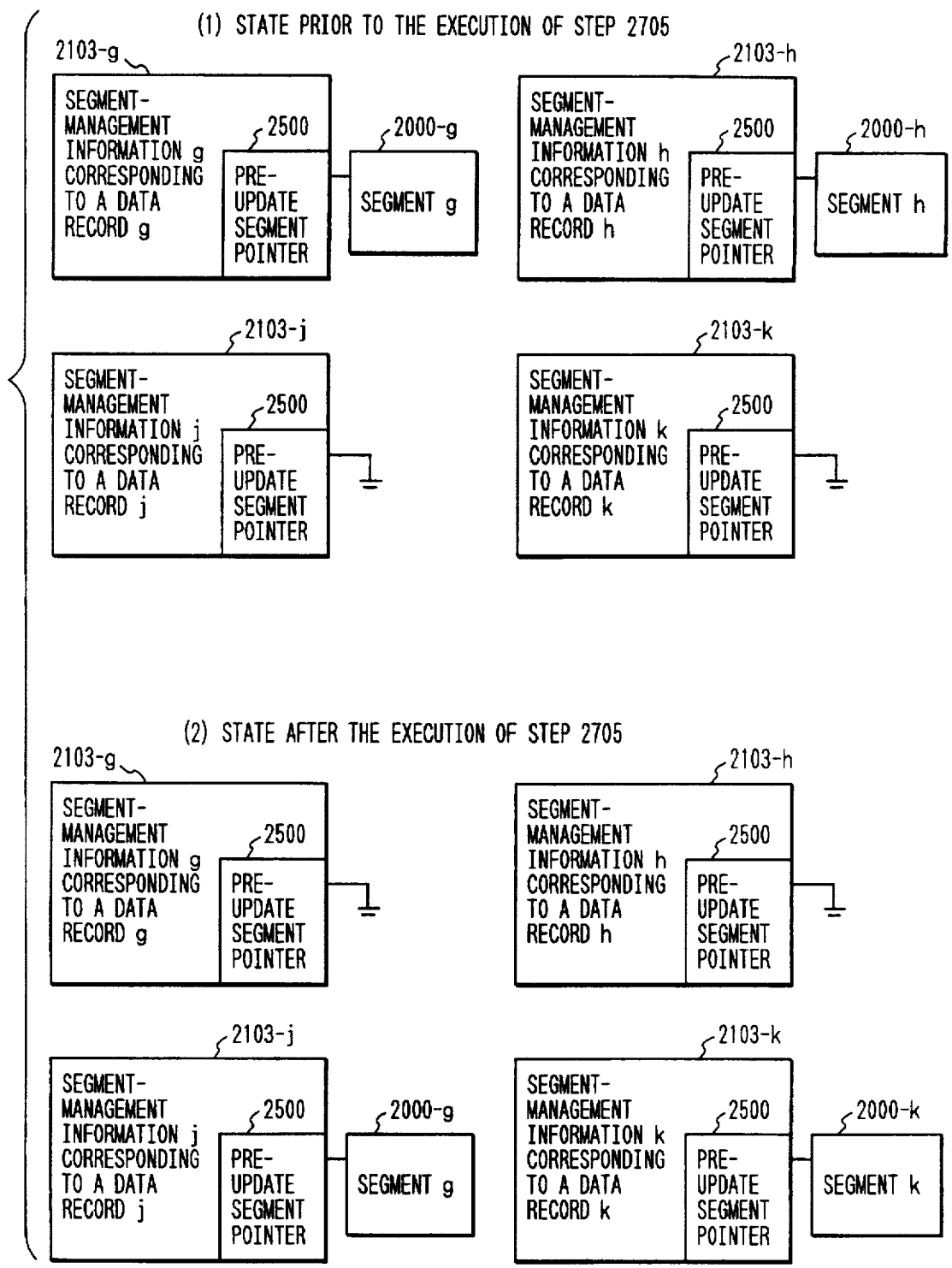
FIG. 16(1) and 16(2) are conceptual diagrams showing how the segment-management information changes when the assignment of a logical record is changed.

The flow then proceeds to a next step 2705 to reassign the logical record found at the step 2704 to a data record not allocated yet to any logical record. FIG. 16 is a diagram showing how the segment-management information changes due to the processing carried out at the step 2705. It should be noted that, in the figure, a parity group to be scheduled is denoted by a parity group "f" and data records "j" and "k" are data records in the parity group "f" not allocated to any logical records. Data records "g" and "h" are data records that have received new values of logical record. (Data records and "h" are the records which are found at the step 2704.) As shown in the figure, at the step 2705, a segment 2000-g used to be pointed to by a pre-update segment pointer 2500 in segment-management information entry 2103-g allocated to the data record "g" now gets pointed to by a pre-update segment pointer 2500 in segment-management information entry 2103-j allocated to the data record "j". In addition, a segment 2000-h used to be pointed to by a pre-update segment pointer 2500 in segment-management information entry 2103-h allocated to the data record "h" now gets pointed to by a pre-update segment pointer 2500 in segment-management information entry 2103-k allocated to the data record "k". The processing at the step 2705 is carried out by copying the value of the pre-update segment pointer 2500 in the segment-management information entry 2103-g to the pre-update segment pointer 2500 in the segment-management information entry 2103-j and setting the value of the pre-update segment pointer 2500 in the segment-management information entry 2103-g at NULL. Likewise, the value of the pre-update segment pointer 2500 in the segment-management information entry 2103-h is copied to the pre-update segment pointer 2500 in the segment-management information entry 2103-k, setting the value of the pre-update segment pointer 2500 in the segment-management information entry 2103-h at NULL. The processing carried out at the step 2705 changes the allocation state prior to processing shown in FIG. 16 (1) to the allocation state after processing shown in FIG. 16 (2). Furthermore, along with this change in allocation, the mapping-information entry 2100 and the data-record allocation information entry 2101 are also updated as well.

As all unallocated data records in the parity group determined to be scheduled get into an allocated state, the flow proceeds to a step 2706 to examine the state of data storage of parity records pertaining to the parity group in the cache 1308 in order to determine information to be used in the creation of new values of the parity records. A new value of a parity record can be created from either of the following pieces of information:

(1) Most recent values of all data records in the parity group. In this case, the values of data records which do not have values requiring the updating of the parity records are also needed. Such data records are those which have not been updated by the processing unit 1300 after they were written into the disk units 1304.

(2) A new value and the old value of the data record and the old value of the parity record.

In this embodiment, the pieces of information (1) and (2), whose amount of information stored in the cache 1308 is larger, is selected as information to be used in the creation of a new value of a parity record. In this way, the amount of load processing from the disk units 1304 can thereby be reduced. It is worth noting that, at that time, the busy flag 2504 in the segment-management information entry 2103 allocated to the physical record used for storing the information selected for use in the creation of a new value of the parity record is turned on.

The flow then proceeds to a step 2707 to check whether or not the information selected at the step 2706 for use in the creation of a new value of the parity record includes information not stored in the cache 1308. If all the necessary information is stored in the cache 1308, the flow jumps to a step 2710. If some information not stored in the cache 1308 exists, on the other hand, the flow proceeds to a step 2708 to allocate a segment 2000 in the cache 1308 and, if necessary, a segment-management information entry 2103 for storing the information in the cache 1308. At that time, the busy flag 2504 in the segment-management information entry 2103 is turned on. In addition, the post-update segment pointer 2501 in the segment-management information entry 2103 is set to point to the allocated segment 2000. Then, at a step 2709, the load processing unit 102 is called to read out the necessary information from a disk unit 1304 and stores the information in the allocated segment 2000.

Figure 17:
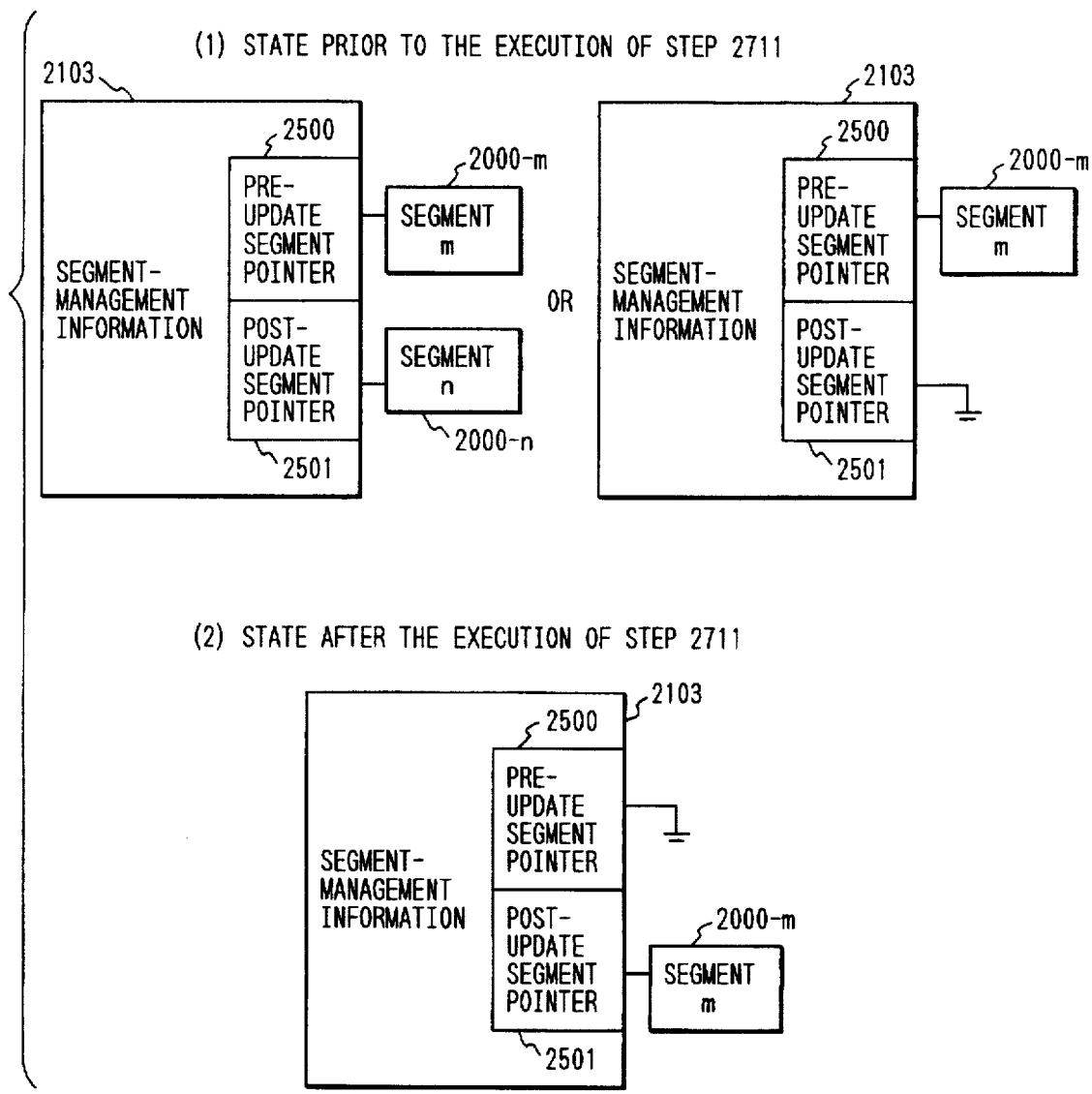
FIGS. 17(1) and 17(2) are conceptual diagrams showing how the segment-management information changes when a post-update segment pointer is switched from a segment to another.

At a step 2710, a new value of a parity record is created by the parity generating unit 103 from the information determined earlier. After the new value of the parity record has been created, the values of the pre-update segment pointers 2500 in the segment-management information entries 2103 allocated to the data record having a new value and the values of the preupdate segment pointers 2500 in the segment-management entries 2103 allocated to the parity record are transferred to the post-update segment pointers 2501 at a step 2711 so that the segments 2000 used for storing the new values are pointed to by the post-update segment pointers 2501. States before and after the processing carried out at the step 2711 are shown in FIG. 17 (1) and (2) respectively. To put it in concrete terms, the post-update segment pointer 2501 is set to point to a segment (m) which is used for storing a new value denoted by reference numeral 2000-m and the value of the pre-update segment pointer 2500 so far pointing to the segment 2000-m used for storing a new value is set at NULL. Moreover, a segment n 2000-n is released. It should be noted that, in order to make sure that the contents of the segment having the new value are later on written into a disk unit 1304, the dirty flag 2502 is turned on. In addition, the busy flag 2504 of the segment-management information entry 2103 allocated to a data record, which has no new value and was used in the creation of the new value of the parity record 1501, is turned off.

Finally, at a step 2712, the destage processing unit 104 is called to write the new values of the logical record and the parity record into a disk unit 1304.

The flow of the processing described above is indicated by arrows ① to ⑤ shown in FIG. 13. The arrow ① indicates the storing of new values of logical records (c) and (e) into the cache 1308 in accordance with a write request from the processing unit 1300. The arrow ② indicates the change in assignment of the logical record made at the step 2705. It should be noted that, as described above, the change in assignment of the logical record is made by merely updating the pre-update segment pointer in a segment-management information entry allocated to a data record whose contents are updated to a new value (e) without the necessity of moving the segment containing the new value (e). The arrow ③ indicates a state in which necessary information not stored in the cache 1308 is loaded at the step 2709 for the creation of a new value of a parity record. The arrow ④ indicates the flow of data in the updating of a parity record at the step 2710. Finally, the arrow ⑤ indicates the state in which data and parity records are stored in a disk unit 1304 by the destage processing carried out at the step 2712.

Figure 18:
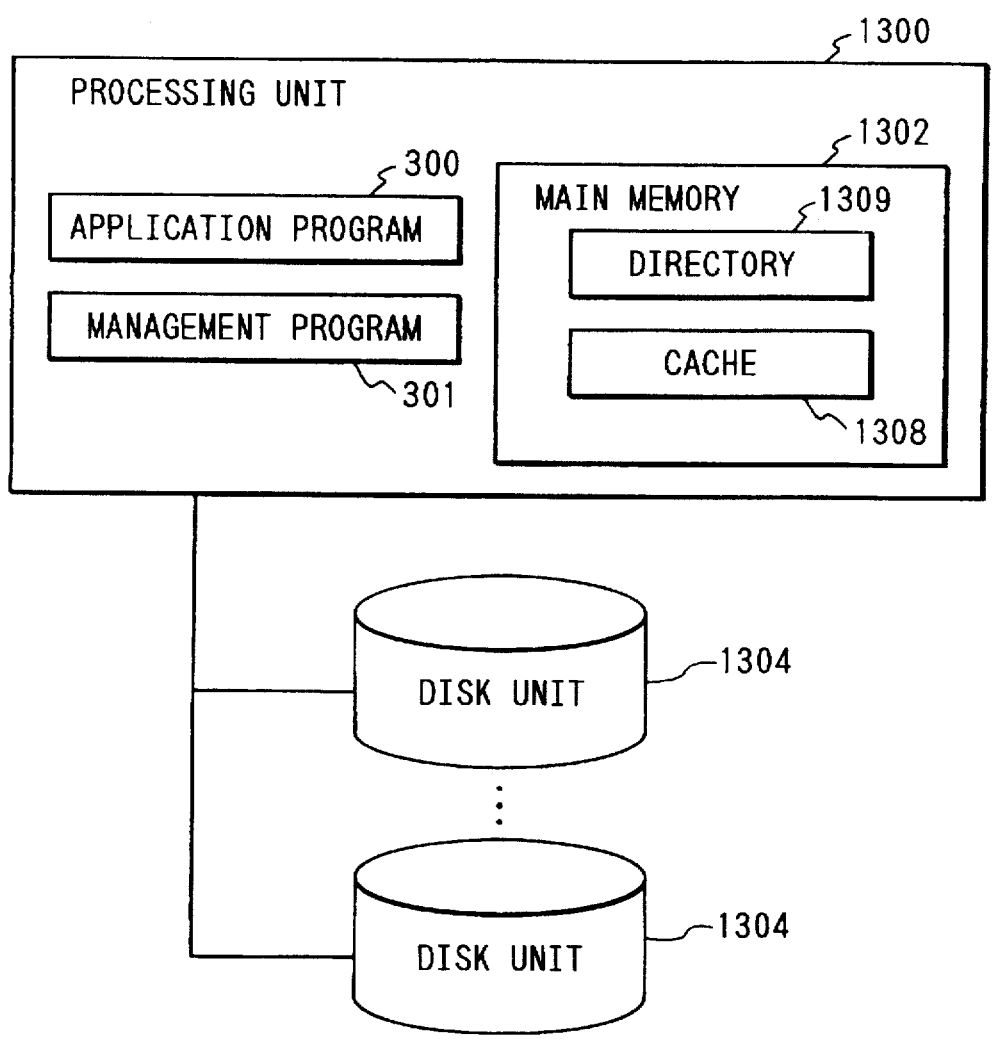
FIG. 18 is diagram showing the configuration of a computer system in a second embodiment.

The embodiment described above is a system including a control unit 1305 connected between the disk units and the processing unit 1300. It is worth noting, however, that the scope of the present invention is not limited to such a system. The present invention can also be applied to a system wherein the processing unit 1300 is connected directly to disk units 1304 through no control unit 1305 between them. A second embodiment shown in FIG. 18 is an example of a system having such a configuration. In this embodiment, the cache 1308 and the directory 1304 are implemented in the main memory unit 302 of the processing unit 1300. The main memory unit 302 can be made volatile or nonvolatile without specifically giving rise to a problem in the implementation of the present invention.

As shown in FIG. 18, an application program 300 and a management program 301 are executed on the processing unit 1300. In the second embodiment, management functions of the first embodiment such as the cache 1308, the directory 1309 and the parity groups provided to the disk control processors 1310 are implemented by the management program 301. In addition, in the second embodiment, the application program 300 issues a read/write request for a logical record 1700 to the management program 301. Receiving such a read/write request, the management program 301 maps the logical record 1700 onto a data record 1500 stored in a disk unit. That is to say, the processing unit 1300 and the control unit 1305 shown in FIG. 2 correspond to the application program 301 and the management program 301 respectively shown in FIG. 18. Accordingly, the management program 301 completes a write request at a stage at which data specified by a write request made by the application program 300 is stored into the cache 1308. Later on, the management program 301 controls an operation to write the data into a disk unit 1304. The actual configurations of the directory 1309, the cache 1308 and other components in the first embodiment can be applied to this embodiment as they are. In addition, processings carried out by the management program in this embodiment are the same as those of the disk control processors employed in the first embodiment, making it unnecessary to specifically explain the processings.

According to the present invention, by providing extra records in each disk unit of a disk array, the number of times to read out necessary information for the creation of new values of parity records from disk units and the number of times to write the new values of the parity records into disk units can be reduced. In addition, in the present invention, even in the case where only one unallocated area exists, the unallocated area can be utilized effectively. As a result, it is no longer necessary to execute a special processing to put all data records of a parity group in an unallocated state.

We claim:

1. A storage apparatus system comprising:

a plurality of storage apparatuses each comprising a plurality of storage areas; and a control unit having a cache memory, wherein:

said storage areas are divided into a plurality of storage area groups each comprising m data storage areas and n redundant-data storage areas used for storing redundant data for recovering data stored in said m data storage areas, where m and n are numbers equal to or greater than unity;

said m data storage areas and said n redundant-data storage areas are each located in a distinct individual one of said storage apparatuses; and said m data storage areas are each in a state either allocated or unallocated to a logical record which is read or written by a read/write request made by a processing unit, said control unit comprising:

means for receiving write data from said processing unit to be written into a logical record specified in a write request made by said processing unit, storing said write data into said cache memory and notifying said processing unit of completion of said write request;

determining means for searching said cache memory to find out if said write data received from said processing unit is in said cache memory and determining said redundant data of which storage area group is to be created;

classifying means for dividing data storage areas in said storage area group determined by said determining means to have said redundant data thereof created into two groups each in a state allocated or unallocated to a logical record to be read or written by said processing unit;

searching means for searching said data storage areas not pertaining to said storage area group determined by said determining means for data storage areas which are allocated to logical records including write data received from said processing unit in said cache memory; and allocating means for allocating said data storage areas in an unallocated status found by said classifying means to said logical records to which said data storage areas searched for by said searching means are allocated.

2. The storage apparatus system according to claim 1, further comprising means for searching said storage area groups for one storage area group having all said data storage areas thereof in a state unallocated to a logical record to be read or written by said processing unit and determining said one storage areas group as one to have said redundant data thereof remaining to be created.

3. The storage apparatus system according to claim 1, wherein said searching means searches said data storage areas not pertaining to said storage area group determined to have said redundant data thereof created among said storage areas in a predetermined range of said storage apparatus for one of said data storage areas which are allocated to logical records including write data received from said processing unit, said redundant data associated with which data storage area to be created.

4. A computer system comprising a plurality of storage apparatuses each comprising a plurality of storage areas and a processing unit having a cache memory for temporarily holding data to be stored in said storage apparatuses, wherein:

said storage areas are divided into a plurality of storage area groups each comprising m data storage areas and n redundant-data storage areas used for storing redundant data for recovering data stored in said m data storage areas, where m and n are numbers equal to or greater than unity;

said m data storage areas and said n redundant-data storage areas each being located in a distinct individual one of said storage apparatuses; and said m data storage areas are each in a state either allocated or unallocated to a logical record which is read or written by an application program executed by a processing unit, said processing unit comprising:

means for receiving write data to be written into a logical record specified in a write request made by said application program and storing said write data into said cache memory;

determining means for searching said cache memory to find out if said write data received from said application program is assigned in said cache memory and determining said redundant data of which storage area group is to be created;

classifying means for dividing data storage areas in said storage area group determined by said determining means to have said redundant data thereof created into two groups each in a state allocated or unallocated to a logical record to be read or written by said application program;

searching means for searching said data storage areas not pertaining to said storage area group determined by said determining means for data storage areas which are allocated to logical records including said write data received from said application program in said cache memory; and allocating means for allocating said data storage areas in an unallocated status found by said classifying means to said logical records to which said data storage areas searched for by said searching means are allocated.

5. The computer system according to claim 4, further comprising means for searching said storage area groups for one having all said data storage areas thereof in a state of unallocated to a logical record or written by said application program, and determining said storage area group searched for as one of said storage area groups with said redundant data thereof remaining to be created.

6. The computer system according to claim 4, wherein said searching means searches said data storage areas not pertaining to said storage area group determined to have said redundant data thereof created among said storage areas in a predetermined range of said storage apparatus for one of said data storage areas which are allocated to logical records including write data received from said application program, said redundant data being associated with which data storage area that is to be created.

7. A control method executed by a control unit for controlling a storage apparatus system comprising, in addition to said control unit, a plurality of storage apparatuses each comprising a plurality of storage areas, wherein:
   a cache memory is employed in said control unit;
   said storage areas are divided into a plurality of storage area groups each comprising m data storage areas and n redundant-data storage areas used for storing redundant data for recovering data stored in said m data storage areas, where m and n are numbers equal to or greater than unity;
   said m data storage areas and said n redundant-data storage areas are each located in a distinct individual one of said storage apparatuses; and
   said m data storage areas are each in a state either allocated or unallocated to a logical record of a read/write request made by a processing unit,
   said control method comprising the steps of:
   receiving write data from said processing unit to be written into a logical record specified in a write request made by said processing unit, storing said write data into said cache memory and notifying said processing unit of completion of said write request;
   finding out if said write data received from said processing unit is in said cache memory, and determining said redundant data of which storage area group is to be created;
   dividing data storage areas in said storage area group determined to have said redundant data thereof created into two groups each in a state allocated or unallocated to a logical record to be read or written by said processing unit;
   searching said data storage areas not pertaining to said storage area group determined by said determining step for one of said data storage areas which are allocated to logical records including write data received from said processing unit in said cache memory; and
   allocating said data storage areas in an unallocated status found by said dividing step to said logical records to which said data storage areas searched for by said searching means are allocated.

8. The control method of a storage apparatus system according to claim 7, wherein said determining step and subsequent processing are executed independently of a read/write request made by said processing unit.

9. A control method executed by a control unit for controlling a storage apparatus system comprising, in addition to said control unit, a plurality of storage apparatuses each comprising a plurality of storage areas, wherein:
   a cache memory is employed in said control unit;
   said storage areas are divided into a plurality of storage area groups each comprising m data storage areas and n redundant-data storage areas used for storing redundant data for recovering data stored in said m data storage areas, where m and n are numbers equal to or greater than unity;
   said m data storage areas and said n redundant-data storage areas are each located in a distinct individual one of said storage apparatuses; and
   said m data storage areas are each in a state either allocated or unallocated to a logical record to be read or written by an application program executed by a processing unit,
   said control method comprising the steps of:
   receiving write data to be written into a record specified in a write request made by said application program, storing said write data into said cache memory and notifying said processing unit of completion of handling of said write request;
   finding out if said write data received from said processing unit is in said cache memory and determining said redundant data of which storage area group is to be created;
   dividing data storage areas in said storage area group determined to have said redundant data thereof created into two groups each in a state allocated or unallocated to a logical record to be read or written by said application program;
   searching said data storage areas not pertaining to said storage area group determined by said determining step for one of said data storage areas which are allocated to a logical record including write data received from said application program in said cache memory; and
   allocating said data storage areas in an unallocated status found by said dividing step to said logical records to which said data storage areas searched for by said searching step are allocated.

10. The control method according to claim 9, wherein said determining step and subsequent processings are executed independently of a read/write request.

11. A control method for controlling a storage apparatus system comprising:
    a plurality of disk units; and
    a control unit used for controlling said disk units and equipped with a cache memory for holding a part of data stored in said disk units, wherein:
    a plurality of parity groups in said disk units each comprising data records allocated to logical records to be read or written by a processing unit and parity records for recovering data of said data records in the event of a failure; and
    said data records and said parity records comprising each of said parity groups are each located in a distinct individual one of said disk units,
    said data records are each in a state either allocated or unallocated to a logical record;
    said control method comprising the steps of:
    storing a new value of one of said logical records specified in a write request made by said processing unit into said cache memory;
    determining said recovering data of which parity group to be created in accordance with states of data records pertaining to each of said parity groups;
    identifying all data records allocated in said parity group determined by said determining step, in an unallocated state to logical records; and
    allocating said data records in an allocated status by said identifying step to logical records which have write data received from said processing unit in said cache memory.

* * * * *